United States Patent

Larmurier

[15] 3,677,078
[45] July 18, 1972

[54] FLUIDIC-PNEUMATIC DEVICES WITH FORCES BALANCING

[72] Inventor: Claude Fernand Emile Larmurier, Paris, France

[73] Assignee: Compagnie Des Compteurs, Montrouse, France

[22] Filed: May 6, 1971

[21] Appl. No.: 140,746

[30] Foreign Application Priority Data

May 14, 1970 France..................................7017625

[52] U.S. Cl. ..................................73/141 R, 137/85, 73/37
[51] Int. Cl. ..........................................................G01l 1/02
[58] Field of Search ..............73/141 R, 388 BN, 37, DIG. 5; 137/85; 177/201, 212, 208, DIG. 5; 74/DIG. 4

[56] References Cited

UNITED STATES PATENTS

| | | | |
|---|---|---|---|
| 2,632,329 | 3/1953 | Zuehlke | 73/228 |
| 2,670,464 | 2/1954 | Wüensch et al | 137/85 X |
| 3,183,918 | 5/1965 | Bester | 137/85 |

*Primary Examiner*—Charles A. Ruehl
*Attorney*—Pierce, Scheffler & Parker

[57] ABSTRACT

Force balance comprising a beam placed inside an enclosure separated from the outer medium by means of a non-magnetic seal-tight wall in which the means for measuring the position deviation and for transmitting the rebalancing force are made by a fluidic regulating device having a blade provided on one end thereof with a magnetic mass cooperating through the seal-tight wall with another magnetic mass placed on one end of the beam.

3 Claims, 1 Drawing Figure

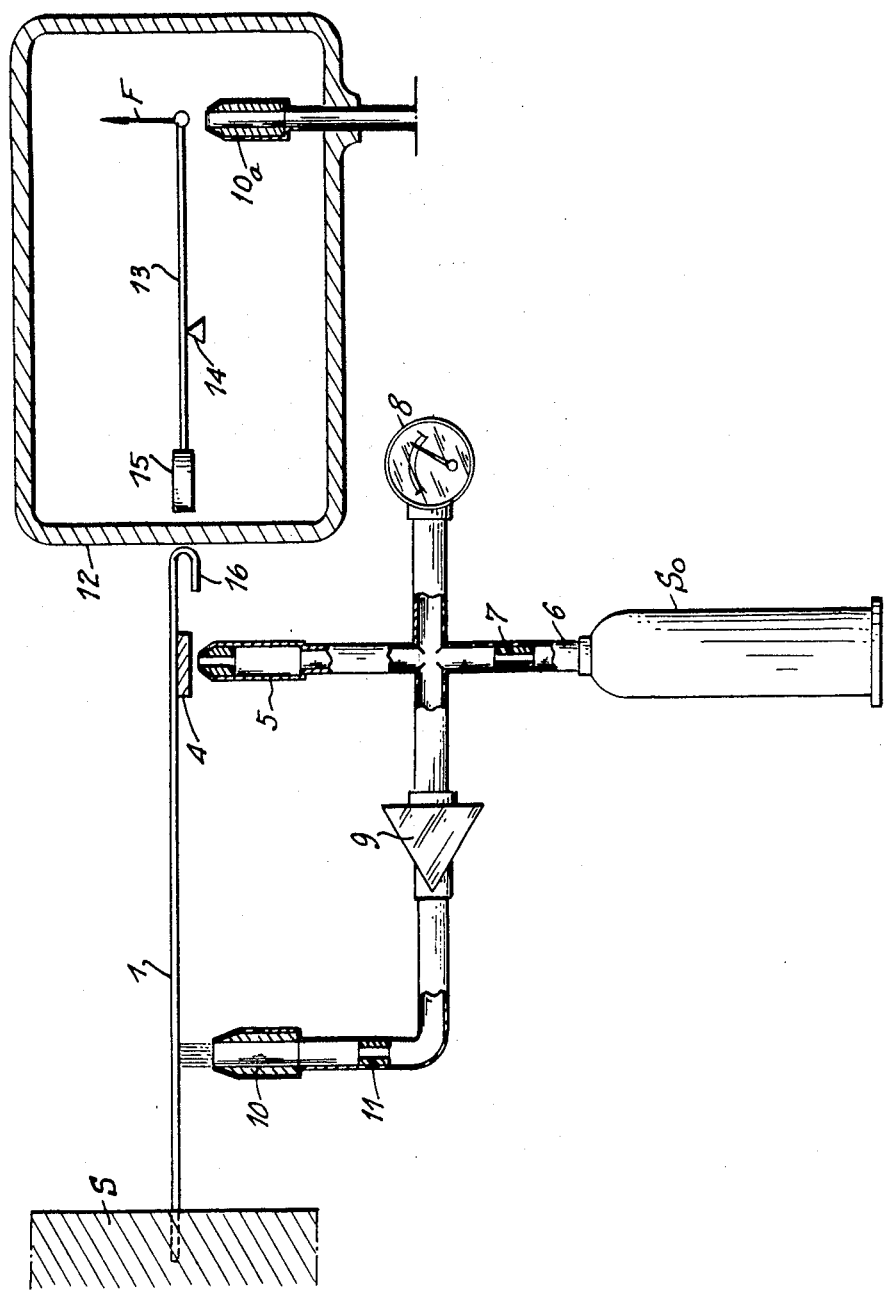

FLUIDIC-PNEUMATIC DEVICES WITH FORCES BALANCING

The present invention relates to improvements to force balances of which both the measurement of the deviation and the transmission of the rebalancing forces are made through a seal-tight wall.

Fluidic pneumatic regulating devices with force rebalancing are already known. Such devices are particularly disclosed in the French Pat. application No. 70-07134 filed on Feb. 27, 1970 by Compagnie des Compteurs.

The purpose of the present invention is mainly to realize a force balance embodying such a regulating device and making use of the advantages thereof.

The invention has more precisely for its object the provision of a force balance comprising a beam submitted to a force and placed inside an enclosure separated from the outer medium by means of a seal-tight wall, means for measuring the deviation of the beam and for transmitting a rebalancing force, said means being made by a fluidic regulating device comprising at least a flexible blade, a deviation detector with nozzle, an amplifier controlled by said detector and at least a jet rebalancing means controlled by the amplifier and acting on said blade, said blade being further provided near one end thereof with a magnetic mass cooperating through the seal-tight wall with another magnetic mass, said another magnetic mass being fixed on one end of the beam, and said seal-tight wall being made of a non-magnetic material.

Several other features of the invention will now be revealed when reading the following description with reference to the accompanying drawing which shows illustrative and by no means limitative embodiment of the present invention and in which:

The only FIGURE shows diagrammatically the balance of the invention.

A blade 1, made of a flexible material, has been shown inserted at one end thereof in a support S, while a small plate 4 is fixed near the other end of said blade. A nozzle 5 is fed with a fluid from a source So, via a conduct 6 through a pneumatic resistance 7 made for example by a throttle in conduct 6. The nozzle 5 is placed at a short distance from the small plate 4 shorter than one fourth of the diameter of the opening of the nozzle. An important pressure variation is thus obtained of the fluid coming from the nozzle 5 and hitting the small plate 4, for a slight displacement of said small plate 4, whereby enabling to detect the position duration of the blade 1. The output pressure is measured by a pressure-gauge 8 and then provide an information as to the importance of the deviation. Said output pressure controls a fluidic amplifier 9 of a known type and whose output signal feeds a jet-blower 10 via a pneumatic resistance 11.

Said pneumatic resistance 11 is eventually adjustable and may be made by a needle-valve (apex-angle from 2° to 4°) more or less closing a small thin tube; it is also possible to only use a throttle on the conduct.

The jet coming from jet-blower 10 exerts onto the blade 1 a feed-back action which rebalances said blade whenever the latter shows a position deviation with respect to the equilibrium balance thereof.

The fluidic component which has just been described is separated from the mobile equipment of a balance, and this mobile equipment is enclosed in an enclosure limited by a seal-tight wall 12. Said wall is made of a non-Magnetic material and the mobile equipment is made of a beam 13 pivotally mounted on a spindle 14.

A force F to be measured is applied on one end of the beam by any suitable means, for example said force may be the force exerted by a fluid blowed on said end via a jet-blower 10a, by a magnetic field, etc. The other end of the beam 13 is provided with a mass 15 made of a magnetic material. When said mobile equipment is on balance, said mass 15 is placed at the level of the free end of the blade located at the other side of wall 12.

Said free end of the blade is moreover provided with another magnetic mass 16. If the blade 1 is made of steel or other magnetic material, the magnetic mass 16 may be obtained through influence of mass 15 on the steel of said blade, of which the free end may be bent over.

Thus, when the force F is applied to the mobile equipment, previously on balance, said mobile equipment is then unbalanced and the mass 15 deviates. The deviation of the mass 15 causes a position deviation of the blade 1 through mutual action of the magnetic masses 15 and 16. This position deviation is detected by the fluidic component which tends to rebalance the blade 1, and the gauge 8 enables to have an information as to the importance of the force F.

The above described device is equivalent to a force balance with automatic rebalancing, the fluidic component or fluidic regulating device constituting a kind of rebalancing device enabling to transmit through wall 12 the deviation of the beam 13 of the mobile equipment for rebalancing the same.

The above described balance device will correspondingly have various applications. As an example, said balance may substitute the force balance device of the outflow measuring apparatus with control of the volume mass as described in the French Pat. Application No. 69 22124 filed on Jan. 1, 1969 by Compagnie des Compteurs. Said application is obviously only illustrative and the balance may be used with many probes of physical magnitudes displaying forces having low amplitude.

I claim:

1. Force balance comprising a beam submitted to a force and placed inside an enclosure separated from the outer medium by means of a seal-tight wall, means for measuring the deviation of the beam and for transmitting a rebalancing force, said means being made by a fluidic regulating device comprising at least a flexible blade, a deviation detector with nozzle, an amplifier controlled by said detector and at least a jet rebalancing means controlled by the amplifier and acting on said blade, said blade being further provided near one end thereof with a magnetic mass cooperating through the seal-tight wall with another magnetic mass, said another magnetic mass being fixed on one end of the beam, and said seal-tight wall being made of a non-magnetic material.

2. Force balance according to claim 1 wherein said blade is fixed to a support, at the end thereof which is not provided with a magnetic mass.

3. Force balance according to claim 1 wherein the blade is made of a magnetic material and the end of the blade which is provided with a magnetic mass is bent over, whereby the magnetic material of the blade constitutes the magnetic mass.

* * * * *